(12) United States Patent
Tsou et al.

(10) Patent No.: US 12,147,604 B2
(45) Date of Patent: Nov. 19, 2024

(54) TOUCH FEEDBACK DEVICE AND METHOD FOR GENERATING TOUCH FEEDBACK

(71) Applicant: INDUSTRIAL TECHNOLOGY RESEARCH INSTITUTE, Hsinchu (TW)

(72) Inventors: Hung Tsou, Zhubei (TW); Szu-Wei Wu, Taoyuan (TW); Yi-Hsiang Huang, Changhua (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 18/107,208

(22) Filed: Feb. 8, 2023

(65) Prior Publication Data
US 2024/0220018 A1     Jul. 4, 2024

(30) Foreign Application Priority Data

Jan. 4, 2023   (TW) ................................. 112100164

(51) Int. Cl.
*G06F 3/01*     (2006.01)
(52) U.S. Cl.
CPC .................................... *G06F 3/016* (2013.01)
(58) Field of Classification Search
CPC ....................................................... G06F 3/016
See application file for complete search history.

(56) References Cited

U.S. PATENT DOCUMENTS

| | | | |
|---|---|---|---|
| 8,352,199 B2* | 1/2013 | Lan .......................... | G06F 3/011 |
| | | | 702/45 |
| 10,133,367 B2* | 11/2018 | Tsai ....................... | G06F 3/0383 |
| 10,345,909 B2 | 7/2019 | Levesque et al. | |
| 10,782,783 B2* | 9/2020 | Hayashi ................... | G06F 3/165 |
| 11,531,396 B2* | 12/2022 | Hayashi ................... | G06F 3/011 |

(Continued)

FOREIGN PATENT DOCUMENTS

| CN | 105718044 A | 6/2016 |
|---|---|---|
| CN | 109547003 A | 3/2019 |

(Continued)

OTHER PUBLICATIONS

TW Office Action dated Aug. 30, 2023 as received in Application No. 112100164.

*Primary Examiner* — Doon Y Chow
(74) *Attorney, Agent, or Firm* — Maschoff Brennan (57) ABSTRACT

A touch feedback device includes an optical imaging module, an air supplying module, a sensing module, and a signal processing module. The optical imaging module generates a first floating image. The air supplying device forms an airflow field at the outline and/or around the first floating image. The sensing module is configured to sense the change of the airflow field, including the amount of airflow, the air pressure or the speed of airflow caused by the detected object to correspond to a position information. The signal processing module is configured to determine when the position information is inside the preset trigger area of the first floating image outline area, generates at least one feedback command, wherein the at least one feedback command is sent to the optical imaging module to let the optical imaging module generate a second floating image that is different than the first floating image.

18 Claims, 10 Drawing Sheets

(56) References Cited

U.S. PATENT DOCUMENTS

| | | | |
|---|---|---|---|
| 11,614,837 B2 | 3/2023 | Huang et al. | |
| 11,698,605 B2 | 7/2023 | Fattal | |
| 2010/0110384 A1 | 5/2010 | Maekawa | |
| 2011/0107958 A1* | 5/2011 | Pance | G06F 3/016 116/205 |
| 2012/0169586 A1* | 7/2012 | Mitchell | G06F 3/016 345/156 |
| 2013/0100008 A1 | 4/2013 | Marti et al. | |
| 2015/0199011 A1* | 7/2015 | Fukumoto | G06F 3/016 345/173 |
| 2016/0098112 A1* | 4/2016 | Tseng | G06F 3/0227 345/175 |
| 2016/0291715 A1* | 10/2016 | Kim | H04N 13/305 |
| 2018/0196531 A1* | 7/2018 | Tsai | G06F 3/0383 |
| 2021/0089199 A1 | 3/2021 | Yang et al. | |

FOREIGN PATENT DOCUMENTS

| | | |
|---|---|---|
| CN | 112823299 A | 5/2021 |
| CN | 115033101 A | 9/2022 |
| TW | 201415058 A | 4/2014 |
| TW | 202142926 A | 11/2021 |

\* cited by examiner

TOUCH FEEDBACK DEVICE AND METHOD FOR GENERATING TOUCH FEEDBACK

CROSS-REFERENCE TO RELATED APPLICATIONS

This non-provisional application claims priority under 35 U.S.C § 119(a) on Patent Application No(s). 112100164 filed in Taiwan (R.O.C) on Jan. 4, 2023, the entire contents of which are hereby incorporated by reference.

BACKGROUND

1. Technical Field

This disclosure relates to a touch feedback device.

2. Related Art

Non-contact sensor uses non-fraying techniques, there is no friction applied on the sensor at the moving parts, which reduces the possibility of fraying and mechanical failure. Recent years, the need for non-contact sensors increase mainly because using the non-contact sensor is more appropriate for the need of longer lifetime components and related fields that require to sense in rigorous environments.

The present non-contact sensing is present by sound and color, the sense of reality of the user is low, which makes it hard for the user to clearly understand the sensing position, and the scenario of applying it is narrow.

SUMMARY

A touch feedback device according to an embodiment of the present invention includes an optical imaging module, an air supplying module, a sensing module, and a signal process module. The optical imaging module is configured to generate a first floating image. The air supplying module is configured to form an airflow field at a contour area and/or surrounding of the first floating image. The sensing module is configured to sense a variation of the airflow field, including an airflow rate, an air pressure or an airflow speed, caused by a sensed object to correspond as position information. The signal processing module is connected with the optical imaging module, the air supplying module, and the sensing module. The signal processing module is configured to generate at least one feedback instruction when determining the position information is in a preset trigger area of the contour area of the first floating image, wherein the at least one feedback instruction is transmitted to the optical imaging module so that the optical imaging module generates a second floating image different from the first floating image.

According to one embodiment of this disclosure, a method for generating touch feedback includes generating a first floating image with an optical imaging module; generating an airflow field at a contour area and/or a surrounding of the first floating image by an air supplying module; sensing a variation of the airflow field, including an airflow rate, an air pressure, and an airflow speed caused by the sensed object with a sensing module to correspond to positon information; and when the position information is in a preset trigger area of the contour area of the first floating image, outputting at least one feedback instruction, wherein the at least one instruction is sent to the optical imaging module so that the optical imaging module generates a second floating image different from the first floating image.

BRIEF DESCRIPTION OF THE DRAWINGS

The present disclosure will become more fully understood from the detailed description given hereinafter and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may understand the concepts and features of the present invention. The following embodiments further illustrate various aspects of the present invention, but are not meant to limit the scope of the present invention.

Figure 1:
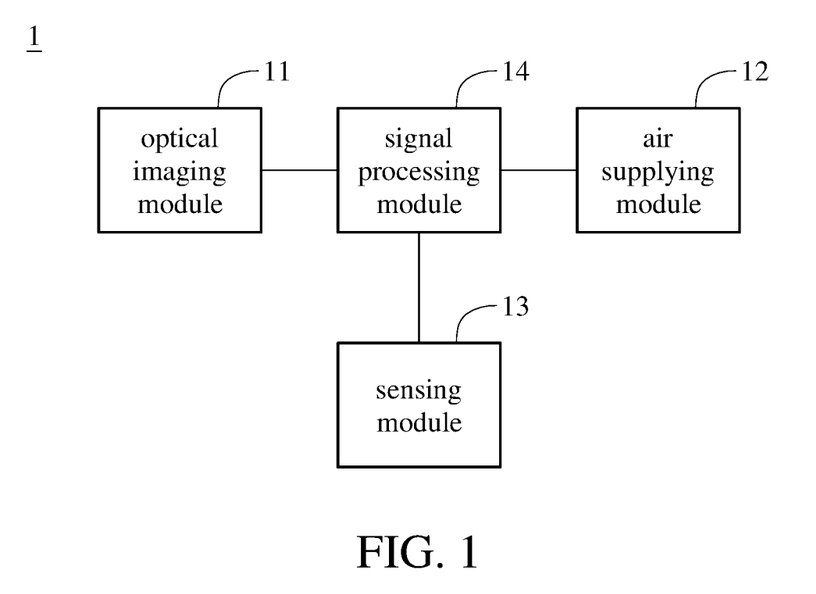
FIG. 1 is a block diagram illustrating the touch feedback device according to an embodiment of the present invention.

Please refer to FIG. 1 which is a block diagram illustrating the touch feedback device according to an embodiment of the present invention.

As shown in FIG. 1, the touch feedback device 1 may include an optical imaging module 11, an air supplying module 12, a sensing module 13 and a signal processing module 14, wherein the optical imaging module 11, the air supplying module 12, and the sensing module 13 may be wired, wireless, or electrically connected to the signal processing module 14, respectively.

The optical imaging module 11 is configured to generate a first floating image. For example, the optical imaging module 11 may include a light source, a light filter and an optical modulator. The light generated by the light source passes through the light filter and the light modulator sequentially, the optical modulator is configured to receive the light passing through the light filter, focus the light passing through the light filter, and generate the floating image. When the light generated by the light source passes through the light filter and the optical modulator, the luminous intensity and the travel direction of the reflected light entering the user's eyes may be reformed by rebuilding the plenoptic function of the object, and a stereo image of the virtual object in the real space is rebuilt in the space so that when the user views the image at any angle, a visual effect that resembles the real object may be generated. In another embodiment, the optical imaging module may include a display and an optical modulator, a floating image may be generated by passing the image light displayed by the display through the optical modulator, the display of the optical imaging module may be seen as integrating the function of the light source and the light filter. In yet another embodiment, the optical imaging module 11 may be implemented by the optical imaging module described in R.O.C Patent application number 110114269.

The air supply module 12 is configured to generate an airflow field at the contour area/or the surrounding of the first floating image. Furthermore, the air supply module 12 may connect to a separate air supply source or the air supply module 12 has it's own air supply source and include air supply structure (for example, air supply tube or air supply hole), and may coordinate with one or more pumps to inject air to the exit of the air supply tube or/and the air supply hole.

The sensing module 13 is configured to sense the variation of the air flow field, comprises an airflow rate, an air pressure, or an airflow speed, and correspond to position information in a later process. For example, the sensing module 13 includes at least one of an airflow rate sensor, an air pressure sensor, and an airflow speed sensor.

The signal processing module 14 is configured to generate at least one feedback instruction when determining the position information is in a preset trigger area of the contour area of the first floating image according to the variation of the airflow field, comprising the airflow rate, the air pressure, or the airflow speed, wherein the at least one feedback instruction is sent to the optical imaging module 11 so that the optical imaging module 11 generates a second floating image which is different from the first floating image. Furthermore, the variation of the airflow rate, air pressure, or the airflow speed being preset values may be used as a trigger condition to generate the feedback instruction. That is, the signal process module 14 may generate the at least one feedback when the signal processing module 14 determines the airflow rate, the air pressure, or the airflow speed in the airflow field is a preset value. For example, the signal processing module 14 includes a central processing unit, a micro controller, a programmable logic controller, a detector and/or other electronic elements with signal processing function, wherein the detector may be an air sensor or an air sampling system. Moreover, the second floating image mentioned may have a different shape, color, image pattern, height, size or luminance etc. than the first floating image.

Figure 2:
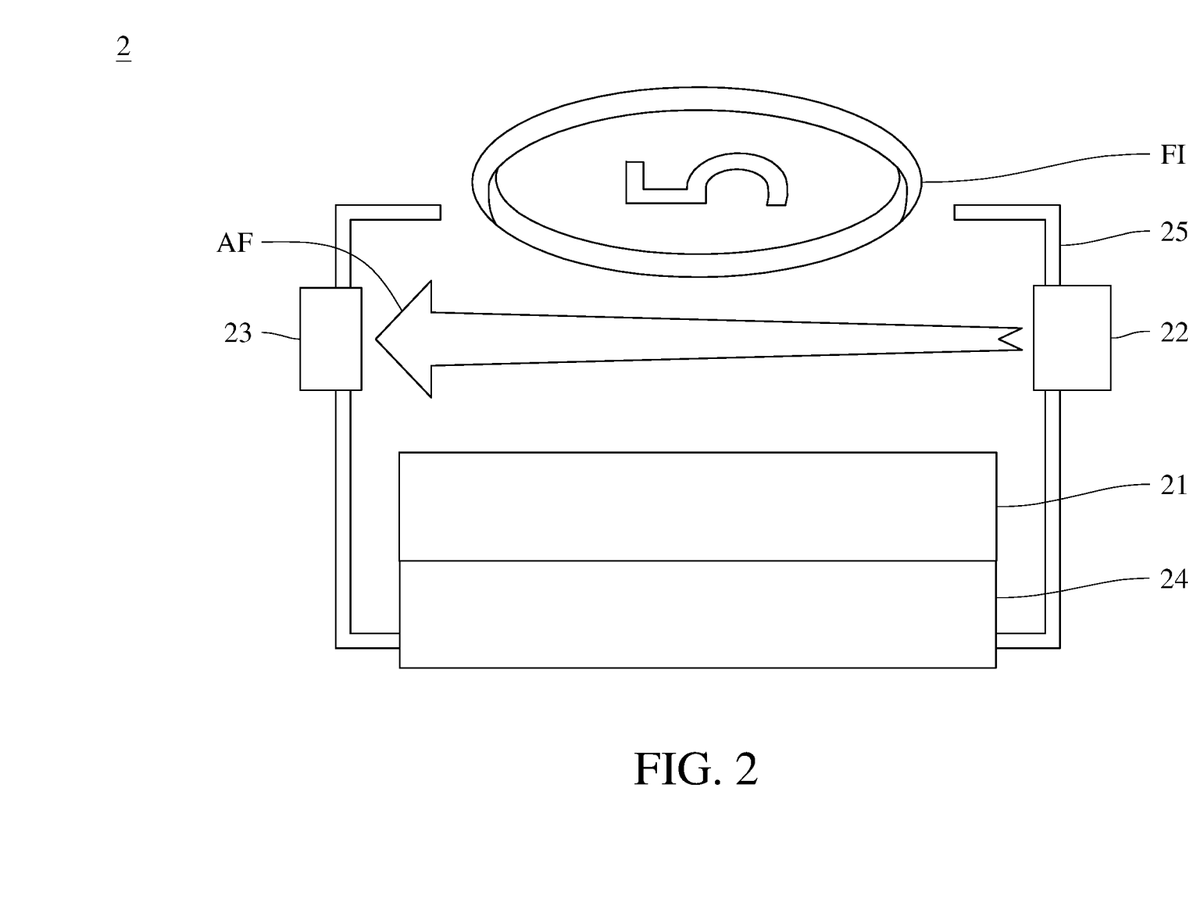
FIG. 2 is a schematic diagram illustrating the touch feedback device according to a first embodiment of the present invention.

Please refer to FIG. 2, which is a schematic diagram illustrating a first embodiment of the touch feedback device according to the present invention.

The touch feedback device 2 includes an optical imaging module 21, an air supplying module 22, a sensing module 23 and a signal processing module 24, wherein the connection and the elements and components to implement the optical imaging module 21, the air supplying module 22, the sensing module 23, and the signal processing module 24 are approximately the same as the optical imaging module 11, the air supplying module 12, the sensing module 13 and the signal processing module 14 mentioned referring to FIG. 1, therefore the same description will not be repeated.

In this embodiment, the touch feedback device 2 may be disposed with a base of the signal processing module 24 and a shell 25, the base of the signal processing module 24 and the shell 25 may form an accommodating space, and the shell 25 has an opening, the opening may connect the accommodating space to the space outside of the shell 25. The optical imaging module 21 may be disposed on the base of the signal processing module 24 and inside the accommodating space. The optical imaging module 21 provides a floating image FI in the direction toward the opening. The air supplying module 22 is disposed at the surrounding of the shell 25, and provides airflow AF at the area between the optical imaging module 21 and the floating image FI to provide real time touch feedback when an object (for example, the user's finger) enters the area thereof. The sensing module 23 is disposed at the surrounding of the shell 25 where it may sense the airflow AF provided by the air supplying module 22, and is at a position relative to the air supplying module 22.

When the touch feedback device 2 is turned on, the optical imaging module 21 generates the floating image FI and the air supplying module 22 may provide the airflow AF to generate the airflow field between the optical imaging module 21 and the floating image FI. The sensing module 23 may sense the airflow rate AF and the signal processing module 24 may record the airflow rate. When an object enters the airflow field, that is, comes close to the area of the floating image FI, the object may sense the touch feedback formed by the air supplying module 22, and the airflow rate detected by the sensing module 23 may change. The signal sensing module 24 may determine whether to trigger the feedback instruction by determining whether the variation of the airflow rate reaches an airflow rate preset value. If the result of determination is yes, then the signal processing module 24 generates the feedback instruction so that floating image FI may display different shape, color, image pattern, height, size, luminance and/or sound signal etc., so there is touch feedback, visual feedback and/or sound feedback provided to the user. The feedback instruction may include light feedback instruction and/or sound feedback instruction, wherein the light feedback instruction is used to provide to the optical imaging module 21 to change the shape, color, pattern, height, size etc. of the floating image, and the sound feedback instruction may be used to trigger a sound module (for example, speaker) to make sound, wherein the sound module may be disposed inside the touch feedback device 2 or may be an external module. If the result of determination is no, then the feedback instruction is not generated, and the signal processing module 24 may determine whether the variation reaches the preset airflow rate value, wherein the preset airflow rate value may be set as, for example, 50% to below 100% of the original airflow rate of the airflow AF.

Figure 3:
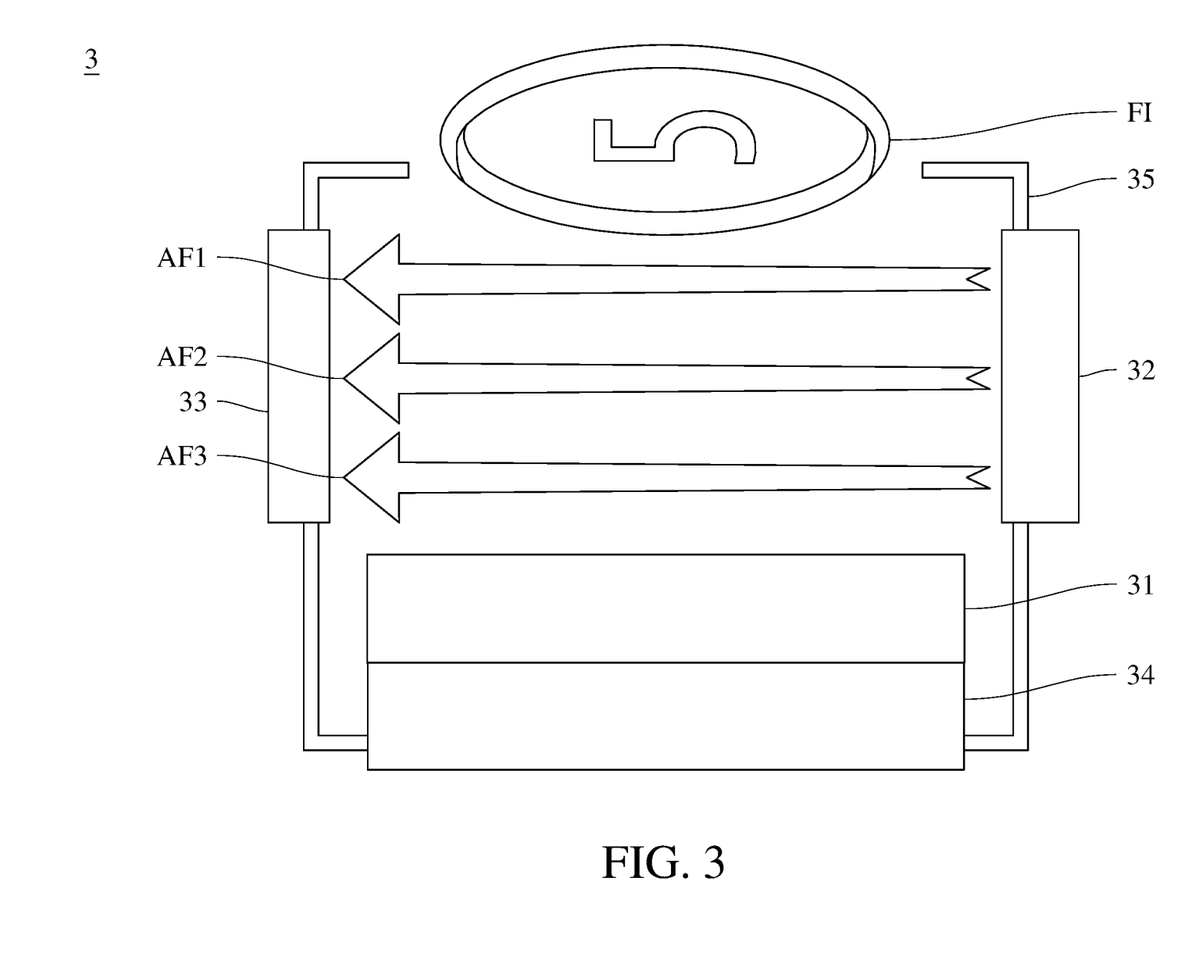
FIG. 3 is a schematic diagram illustrating the touch feedback device according to a second embodiment of the present invention.

Please refer to FIG. 3, which is a schematic diagram illustrating a second embodiment of the touch feedback device according to the present invention.

The touch feedback device 3 illustrated in FIG. 3 includes an optical imaging module 31, an air supplying module 32, a sensing module 33 and a signal processing module 34, wherein the connection and the elements and components to implement the optical imaging module 31, the air supplying module 32, the sensing module 33, and the signal processing module 34 are approximately the same as the optical imaging module 11, the air supplying module 12, the sensing module 13 and the signal processing module 14 mentioned referring to FIG. 1, therefore the same description will not be repeated.

In this embodiment, the touch feedback device 3 may include a base of the signal processing module 34 and a shell 35, the base of the signal processing module 34 and shell 35 may form an accommodating space, and the shell 35 has an opening, the opening may connect the accommodating space to the space outside of the shell 35. The optical imaging module 31 may be disposed on the base of the signal processing module 34 and inside the accommodating space. The optical imaging module 31 provides a floating image FI in the direction to the opening. The air supplying module 32 is disposed at the surrounding of the shell 35, and provides multiple airflows (for example, airflow AF1, airflow AF2, airflow AF3) at the area between the optical imaging module 31 and floating image FI to provide real time touch feedback when an object (for example, the user's finger) enters the area thereof, wherein the airflows AF1, AF2, and AF3 may form multiple airflow layers, respectively. The air supplying module 32 may use multiple air supply holes arranged along the direction that the floating image FI is projected to output multiple airflows AF1 to AF3, wherein the injection direction of the airflows AF1 to AF3 may be vertical, parallel, or diagonal to the arrangement direction of the air supplying hole. The sensing module 33 is disposed at the surrounding of the shell 35 to sense the airflows AF1, AF2, and AF3 provided by the air supplying module 32, and is at a position relative to the air supplying module 32.

The touch feedback device 3 may use an airflow split structure so that the airflow field generated by the air supplying module 32 include multiple airflows, and the airflows thereof are distributed in different depths.

When an object enters the airflow field of touch feedback device 3, the sensing module 33 senses the airflow rates of the airflows AF1, AF2, and AF3 sequentially, the signal process module 34 uses the sensing results of different airflow layers and the preset airflow rate value to determine whether the object enters a preset depth. If it is, then the feedback instruction is triggered; and if not, the feedback instruction is not generated. When the object enters different depths, the floating image may be displayed with different sizes, colors, image patterns, heights, or luminance according to different depths, to let the user understand the trigger situation. Determining whether an object is in the preset depth based on the preset airflow rate is, for example, determining the object entering a depth corresponding to an airflow when the variation of airflows A1, A2, and A3 are greater than 30% of the original.

The above-mentioned airflows AF1, AF2, and AF3 may further be airflows with the same or different intensities, airflow rates, airflow speeds, etc., and an anti-miss trigger sensing is established with the structure thereof. When airflows AF1, AF2, and AF3 are airflows with the same intensity, the ways to trigger the feedback instruction may be to use a single sensor to sense the variation of whole airflow and determine that the airflow reaches a preset flowrate or to use multiple sensors to sense the variation of each airflow and determine that the airflow reaches the preset flowrate. When the airflows AF1, AF2, and AF3 are airflows with different intensities, the way to trigger the feedback instruction may be determining the airflow rates drop to multiple different preset flows, respectively by using multiple sensors to sense the airflow rate of each airflow.

Figure 4:
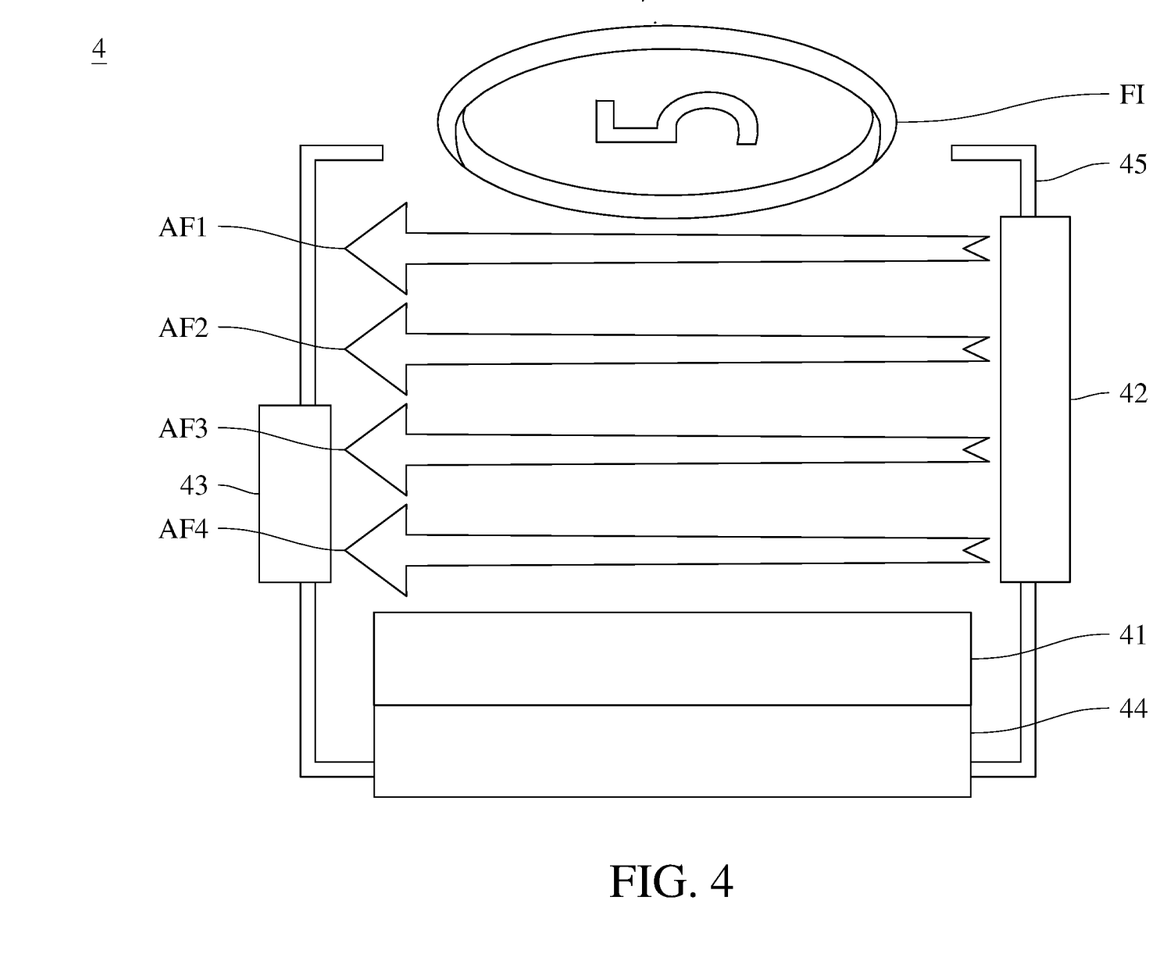
FIG. 4 is a schematic diagram illustrating the touch feedback device according to a third embodiment of the present invention.

Please refer to FIG. 4, which is a schematic diagram illustrating a third embodiment of the touch feedback device according to the present invention.

The touch feedback device 4 illustrated in FIG. 4 includes an optical imaging module 41, an air supplying module 42, a sensing module 43 and a signal processing module 44, wherein the connection and the elements and components to implement the optical imaging module 41, the air supplying module 42, the sensing module 43, and the signal processing module 44 are approximately the same as the optical imaging module 11, the air supplying module 12, the sensing module 13 and the signal processing module 14 mentioned referring to FIG. 1, therefore the same description will not be repeated.

In this embodiment, the touch feedback device 4 may include a base of the signal processing module 44 and a shell 45, the base of the signal processing module 44 and the shell 45 may form an accommodating space, and the shell 45 has an opening, the opening may connect the accommodating space to the space outside of the shell 45. The optical imaging module 41 may be disposed on the base of the signal processing module 44 and inside the accommodating space. The optical imaging module 41 provides a floating image FI in the direction toward the opening. The air supplying module 42 is disposed at the surrounding of the shell 45, and provides multiple airflows (for example, airflow AF1, airflow AF2, airflow AF3) at the area between the optical imaging module 41 and floating image FI to provide real time touch feedback when an object (for example, the user's finger) enters the area thereof, wherein the airflows AF1 to AF4 may form multiple airflow layers, respectively. The air supplying module 42 may use multiple air supply holes arranged along the direction that the floating image FI is projected to output multiple airflows AF1 to AF3, wherein the injection direction of the airflows AF1 to AF4 may be vertical, parallel, or diagonal to the arrangement direction of air supplying holes. The sensing module 43 is disposed at the surrounding of the shell 45 to sense the airflows AF1, AF2, AF3, and AF4 provided by the air supplying module 42 and is at a position relative to the air supplying module 42.

The touch feedback module 4 illustrated in FIG. 4 includes the air supplying module 42 generating four airflows AF1, AF2, AF3, and AF4, wherein at least two airflows of the four airflows AF1 to AF4 have the same airflow intensity. Four airflows AF1 to AF4 with different intensities may be generated alternatively, for example, the airflows AF1 and AF3 have a first intensity, and the airflows AF2 and AF4 have a second intensity which is different from the first intensity to create a touch sensation similar to a rough texture.

When the user puts the object (for example, finger) into the touch feedback device 4, the object may first contact the weak airflow AF1 and the strong airflow AF2, and the object may feel the rough touch generated by the alternative of weak airflow and strong airflow, so that the object know that the touch feedback device is going to be triggered. When the object extends further into the touch feedback device 4, the sensing module 43 senses the airflow rates of weak airflow A3 and strong airflow A4 sequentially, and the signal processing module 43 determines whether to trigger the feedback instruction or not according to the result of airflow rate sensing and the preset airflow rate value. If the determined result is "yes", then the feedback instruction is generated so that the height, color, shape, etc. of the floating image variates to remind the user; if the determined result is "no", then the feedback instruction is not generated, wherein the airflow rate preset value may be set as 50% lower to lower than 100% of the original airflow of the weak airflow AF3 and the strong airflow AF4, and the ratio of the flow of the strong airflow AF4 and the weak airflow AF3 may be greater than 1.5.

Figure 5:
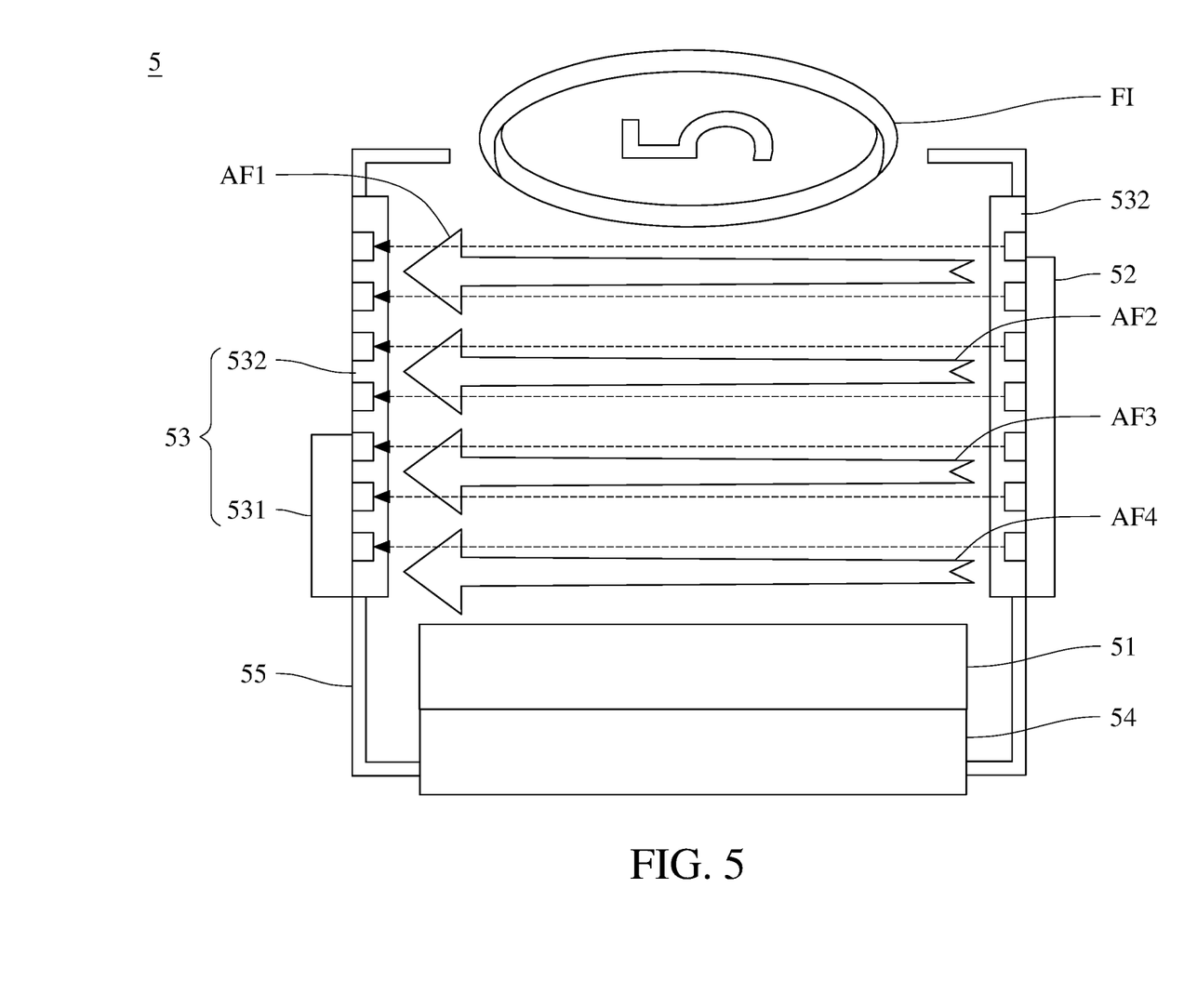
FIG. 5 is a schematic diagram illustrating the touch feedback device according to a fourth embodiment of the present invention.

Please refer to FIG. 5, which is a schematic diagram illustrating a fourth embodiment of the touch feedback device according to the present invention.

The touch feedback device 5 illustrated in FIG. 5 includes an optical imaging module 51, an air supplying module 52, a sensing module 53 and a signal processing module 54, wherein the connection and the elements and components to implement the optical imaging module 51, the air supplying module 52, the sensing module 53, and the signal processing module 54 are approximately the same as the optical imaging module 11, the air supplying module 12, the sensing module 13 and the signal processing module 14 mentioned referring to FIG. 1, therefore the same description will not be repeated.

In this embodiment, the touch feedback device 5 may include a base of the signal processing module 54 and a shell 55, the base of the signal processing module 54 and the shell 55 may form an accommodating space, and the shell 55 has an opening, the opening may connect the accommodating space to the space outside of the shell 55. The optical imaging module 51 may be disposed on the base of the signal processing module 54 and inside the accommodating space. The optical imaging module 51 provides a floating image FI in the direction to the opening. The air supplying module 52 is disposed at the surrounding of the shell 55, and provides multiple airflows (for example, airflow AF1, airflow AF2, airflow AF3) at the area between the optical imaging module 41 and the floating image FI to provide real time touch feedback when an object (for example, the user's finger) enters the area thereof. The air supplying module 52 may use multiple air supply holes arranged along the direction that the floating image FI is projected to output multiple airflows AF1 to AF3, wherein the injection direction of the airflows AF1 to AF4 may be vertical, parallel, or diagonal to the arrangement direction of the air supplying holes. The sensing module 53 may include an air pressure sensor 531 and a depth sensor 532, wherein the air pressure sensor 531 may be an integration of airflow rate sensor, airflow speed sensor and air pressure sensor. The air pressure sensor 531 is disposed at the surrounding of the shell 45 where it may sense the airflows AF1, AF2, AF3, and AF4 provided by the air supplying module 52, and is at a position relative to the air supplying module 52. The depth sensor 532 may be disposed at a surrounding of the shell 55, and is configured to sense depth information of the object in the airflow field generated by the air supply module 52.

The depth sensor 532 may be, for example, a plurality of infrared transmitters and a plurality of infrared sensors arranged along the depth of the accommodating space, wherein the infrared transmitters and the infrared sensors may be in one-on-one relationship. When the object (for example, the user's finger) is inside the area of the infrared, the depth of the object may be known according to the amount of infrared that is influenced. The signal processing module 54 may use the depth information meeting a preset condition as the trigger condition to generate at least one feedback instruction.

The touch feedback device 5 may use the depth information obtained by the depth sensor 532 as one of the trigger conditions of the feedback instruction. For example, when the signal processing module 54 determines that over a certain amount of the infrareds among the infrared received by the infrared sensors cannot be sensed, then the feedback instruction is generated.

In the embodiment above, although infrared sensors and transmitters are used as depth sensors, the present disclosure is not limited thereof, and any type of depth sensor may be used.

Figure 6:
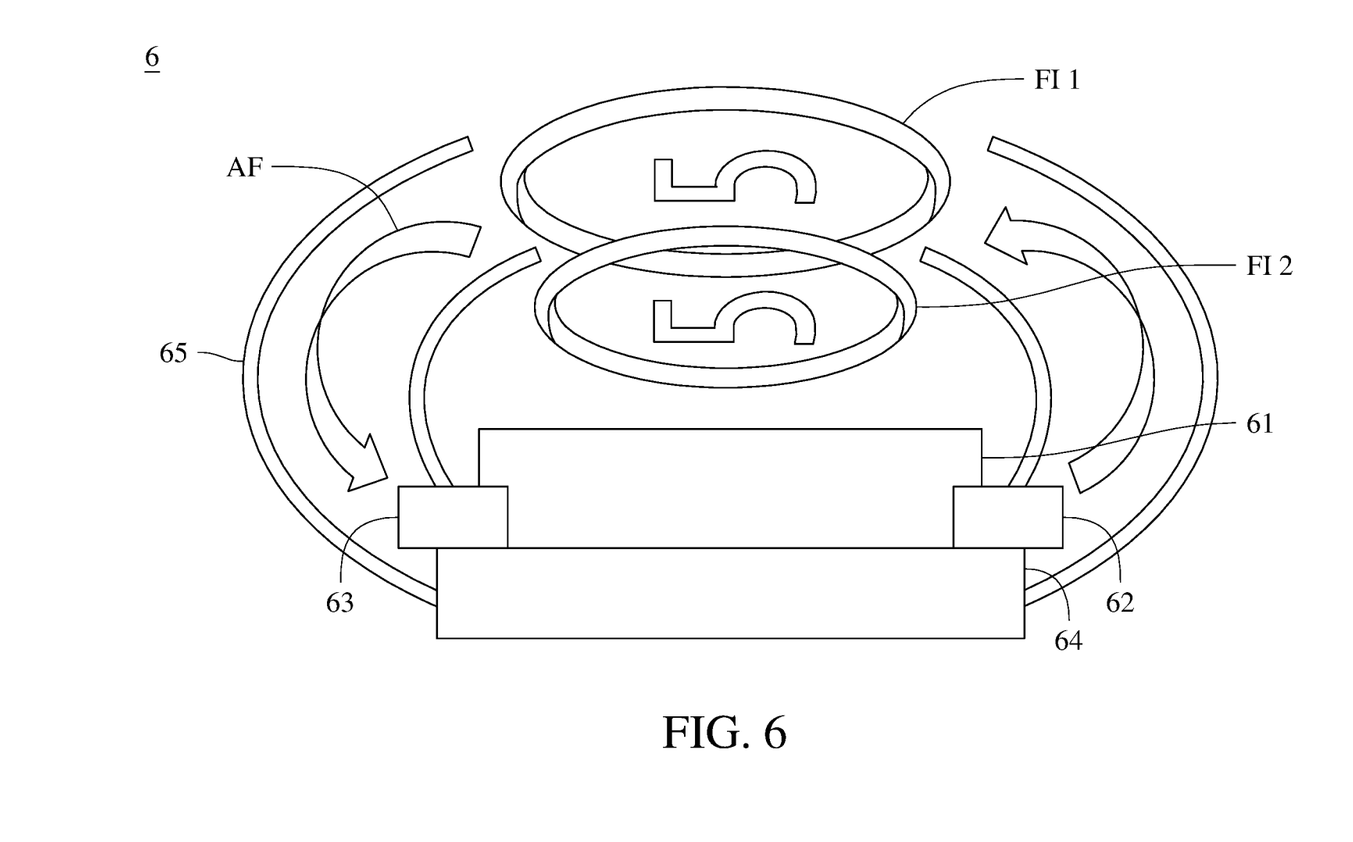
FIG. 6 is a schematic diagram illustrating the touch feedback device according to a fifth embodiment of the present invention.

Please refer to FIG. 6, which is a schematic diagram illustrating the touch feedback device according to a fifth embodiment of the present invention.

The touch feedback device 6 illustrated in FIG. 6 includes an optical imaging module 61, an air supplying module 62, a sensing module 63 and a signal processing module 64, wherein the connection and the elements and components to implement the optical imaging module 61, the air supplying module 62, the sensing module 63, and the signal processing module 64 are approximately the same as the optical imaging module 11, the air supplying module 12, the sensing module 13 and the signal processing module 14 mentioned referring to FIG. 1, therefore the same description will not be repeated.

In this embodiment, the touch feedback device 6 may include a base of the signal processing module 64 and two tubes 65, the base is connected the two tubes 65, and there is an opening between the two tubes 65. The optical imaging module 61 may be disposed on the base of the signal processing module 64 and inside the accommodating space. The optical imaging module 61 provides a floating image FI in the direction to the opening. The air supplying module 62 is disposed at the edge of the base and at least a part of the air supplying module 62 is inside the tube 65 to provide an airflow AF in tube 65, the airflow AF pass through the two tubes 65 to an airflow field at the contour area of floating image FI1, and may provide real time touch feedback when an object (for example, the user's finger) enters the area thereof. The sensing module 63 may be disposed at another edge of the base which is relative to the air supplying module and at least part of the sensing module 63 is inside tube 65, and may sense the airflow provided by the air supply module 62.

When the touch feedback module turns on, the air supply module 62 may form an airflow swirl to create an air wall at the contour are and/or surrounding of the floating image FI1, when the user comes close to the area of the floating image FI1, at least a part of the airflow is blocked and the signal processing module 64 may trigger at least one feedback instruction according to the variation of the air pressure sensed by the sensing module 63, the optical imaging module 61 turns off the floating image FI1 according to the feedback instruction from the signal processing module 64 and generates, for example, a second floating image FI2 with a different height. The difference between the floating image FI1 and the floating image FI2 may also include variation of shape, color, size, image pattern, luminance, etc.

It should be noticed that, the variation of the floating image caused by the feedback instruction may include at least one of the shape, color, size, height, image pattern, and luminance, and is not limited to the floating image shown in the drawings.

Another implementation of the touch feedback device 6 may be generating an air wall of airflow swirl in the area between the tubes 65 and the optical imaging module 61, and when an object enters the air swirl, the sensing module may sense the variation of air pressure in the space, and the signal processing module 64 may trigger the feedback instruction according to the result. Through this implementation, the user may sense a resistance when touching down on the air wall so that the user may feel touch feedback.

Figure 7A:
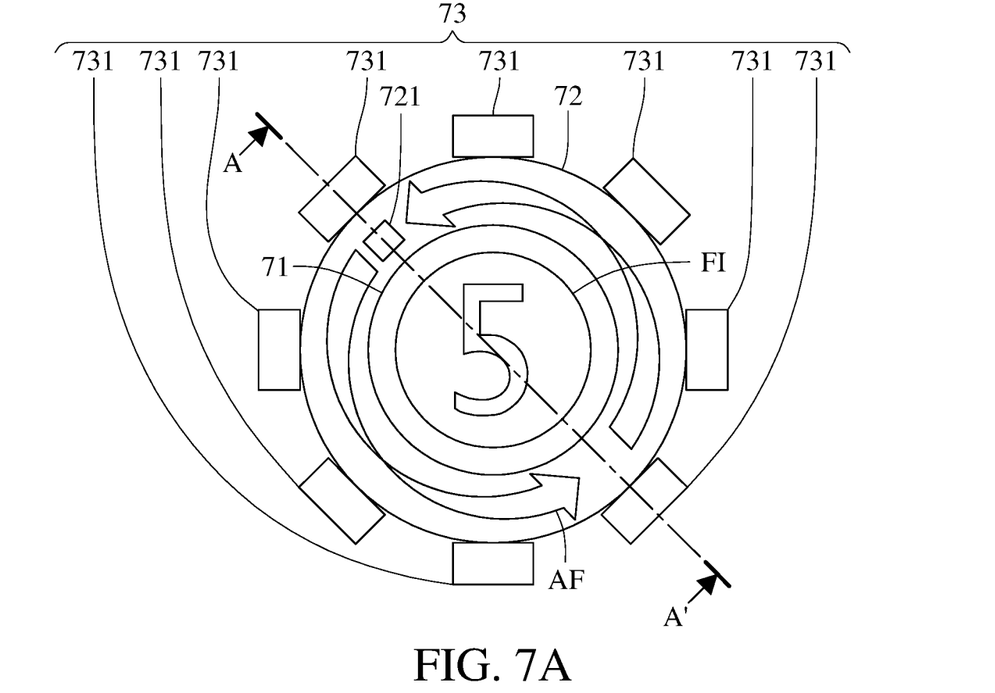
FIGS. 7A and 7B are schematic diagrams illustrating the touch feedback device according to a sixth embodiment of the present invention.
Figure 7B:
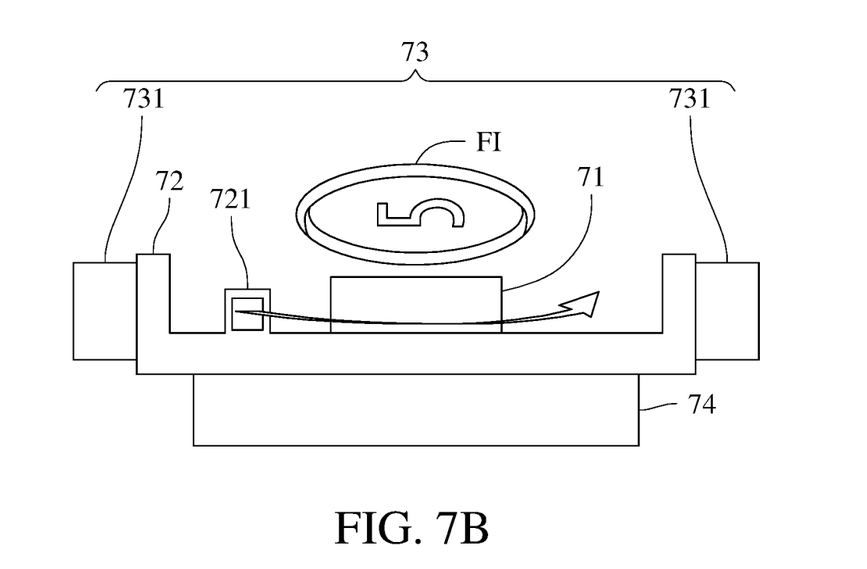

Please refer to FIGS. 7A and 7B, FIG. 7A is a schematic figure illustrating the touch feedback device according to an eighth embodiment of the present disclosure, FIG. 7B is a cross sectional view of the touch feedback device in FIG. 7A taken along the line A-A'.

The touch feedback device 7 illustrated in FIGS. 7A and 7B includes an optical imaging module 71, an air supplying module 72, a sensing module 73 and a signal processing module 74, wherein the connection and the elements and components to implement the optical imaging module 71, the air supplying module 72, the sensing module 73, and the signal processing module 74 are approximately the same as the optical imaging module 11, the air supplying module 12, the sensing module 13 and the signal processing module 14 mentioned referring to FIG. 1, therefore the same description will not be repeated. In the present embodiment, the sensing module 73 includes a plurality of airflow rate/pressure sensors 731.

The touch feedback module 7 has a base which the signal processing module is disposed on, the air supplying module 72 is disposed on the base and may include an accommodating space formed by a concave-like structure. Optical imaging module 71 is disposed on the air supplying module 72, and provides a floating image FI above the optical imaging module 71, and the air supplying module 71 forms an airflow AF around the optical imaging module 71 to provide real time touch feedback when an object (for example, the user's finger) enters the accommodating space formed by the cave-like structure. Multiple airflow rate/pressure sensors 731 may, for example, be disposed at the surrounding of the concave structure of the air supplying module 72, and there may be a same interval between each of the plurality of the airflow rate/pressure sensors 731, but is not limited to thereof.

Touch feedback device 7 creates a knob-like feedback pattern through the annulus airflow formed around the optical imaging module 71 through the air supplying module 72. The air hole 721 may provide an airflow in an air supplying direction to form an annulus airflow in the space between the optical imaging module 71 and the concave structure of the air supplying module 72. The air supplying direction may be different from the projection direction of the floating image FI, for example, it may be vertical to the project direction of floating image FI. When the user puts his/her finger into the annulus airflow and execute movement like spinning, the sensing module 73 may sense the variation of the annulus airflow, the signal processing module 74 may generate at least one feedback instruction according to the variation of airflow rate and the preset airflow rate value to control the optical imaging module 71 to change the floating image FI When the touch feedback device 7 is turned on, the air supplying module 72 provides the annulus airflow through the air supplying hole 721. The optical module 71 generates the floating image FI. When an object comes close to the annulus airflow, the sensing module 73 senses the variation of the air pressure/airflow rate, and the signal processing module 74 determines whether to trigger the feedback instruction or not according to the variation of the air pressure/airflow and the preset value of air pressure/airflow rate.

The signal processing module 74 may determine the movement direction of the object (for example, clockwise direction or counter clockwise direction) according to the sensing order of the sensing module 73 (for example, the way the airflow changes) and provide corresponding functions, for example, the color of the floating image turns from dark to light, the size of the floating image turns from big to small, the height of the floating image turns from high to low, to feedback the current state to the user.

Figure 8A:
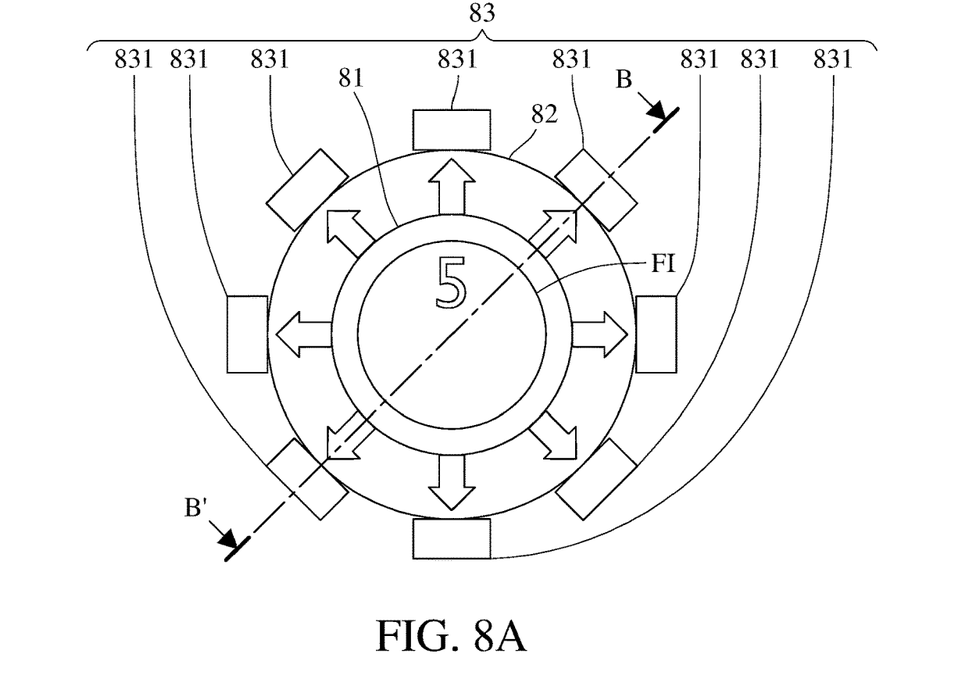
FIGS. 8A and 8B are schematic diagrams illustrating the touch feedback device according to a seventh embodiment of the present invention.
Figure 8B:
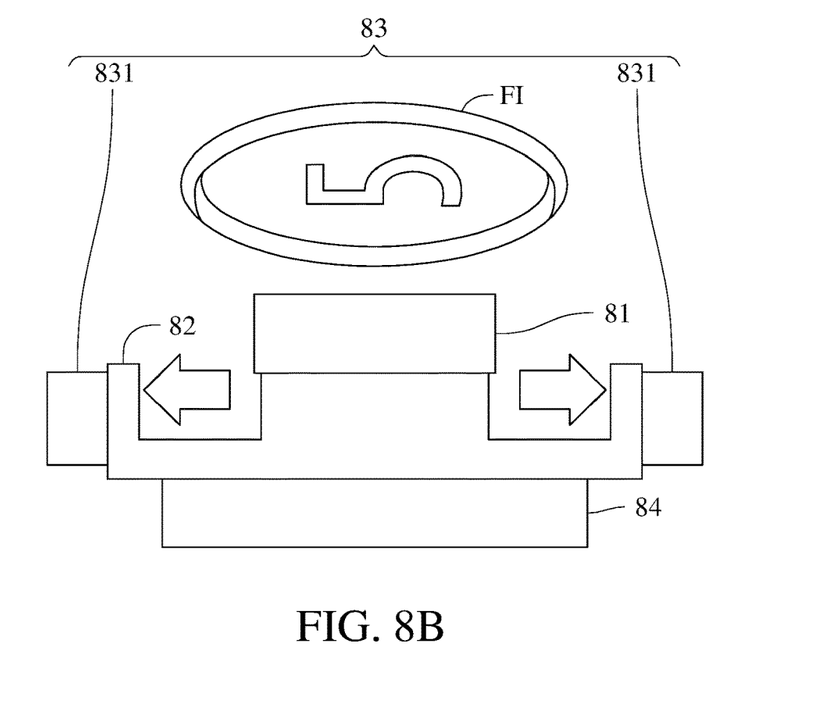

Please refer to FIGS. 8A and 8B, FIG. 8A is schematic diagrams illustrating the touch feedback device according to a seventh embodiment of the present invention, FIG. 8B is a cross sectional figure taken along line B-B' in FIG. 8A.

The touch feedback device 8 illustrated in FIGS. 8A and 8B includes an optical imaging module 81, an air supplying module 82, a sensing module 83 and a signal processing module 84, wherein the connection and the elements and components to implement the optical imaging module 81, the air supplying module 82, the sensing module 83, and the signal processing module 84 are approximately the same as the optical imaging module 11, the air supplying module 12, the sensing module 13 and the signal processing module 14 mentioned referring to FIG. 1, therefore the same description will not be repeated. In the present embodiment, the sensing module 83 includes a plurality of airflow rate/pressure sensors 831.

The touch feedback module 8 has a base which the signal processing module 84 is disposed on, the air supplying module 82 is disposed on the base and may include an accommodating space formed by a concave-like structure. The accommodating space includes a convex member, the convex member may be, for example, a cylinder, and include multiple air supplying holes disposed along the circumference. The air supplying module 82 provides multiple radial airflows through the multiple air supplying holes, wherein the intensity of the airflow in each direction may be determined by the design of the airflow channels in the air supplying module 82. The optical imaging module 81 is disposed on the convex member. The optical imaging module 81 provides floating image FI to the above of the optical imaging module 81, the air supplying module 82 provides multiple airflows below the optical imaging module 81 to provide real time touch feedback when an object (for example, the user's finger) enters the area of the concave-like structure. Multiple airflow rate/pressure sensors 831 may be disposed at the surrounding of the concave structure and there may be a same interval between each of the plurality of the airflow rate/pressure sensors 831, but the present disclosure is not limited to thereof.

The touch feedback device 8 further includes a function of determining the rule of an airflow. For example, the signal processing module 84 may determine whether the sensing result meets the set rules. For example, if the set rule is that the sensed object has to spin (rotate) in a clockwise direction, when the sensed object spins (rotates) in counter clockwise direction, the signal processing module 84 may determine that the sensed object is not spinning in clockwise direction according to the sensing results, and does not generate feedback instruction. On the other hand, if the signal processing module 84 determines that the sensed object is spinning in clockwise direction, then the feedback instruction is generated. However, the set rules of the present disclosure is not limited to thereof, the spinning speed of the sensed object, the variation of the airflow rate, the air pressure and the airflow speed of the airflow field, and others alike may be used as the set rules.

Figure 9:
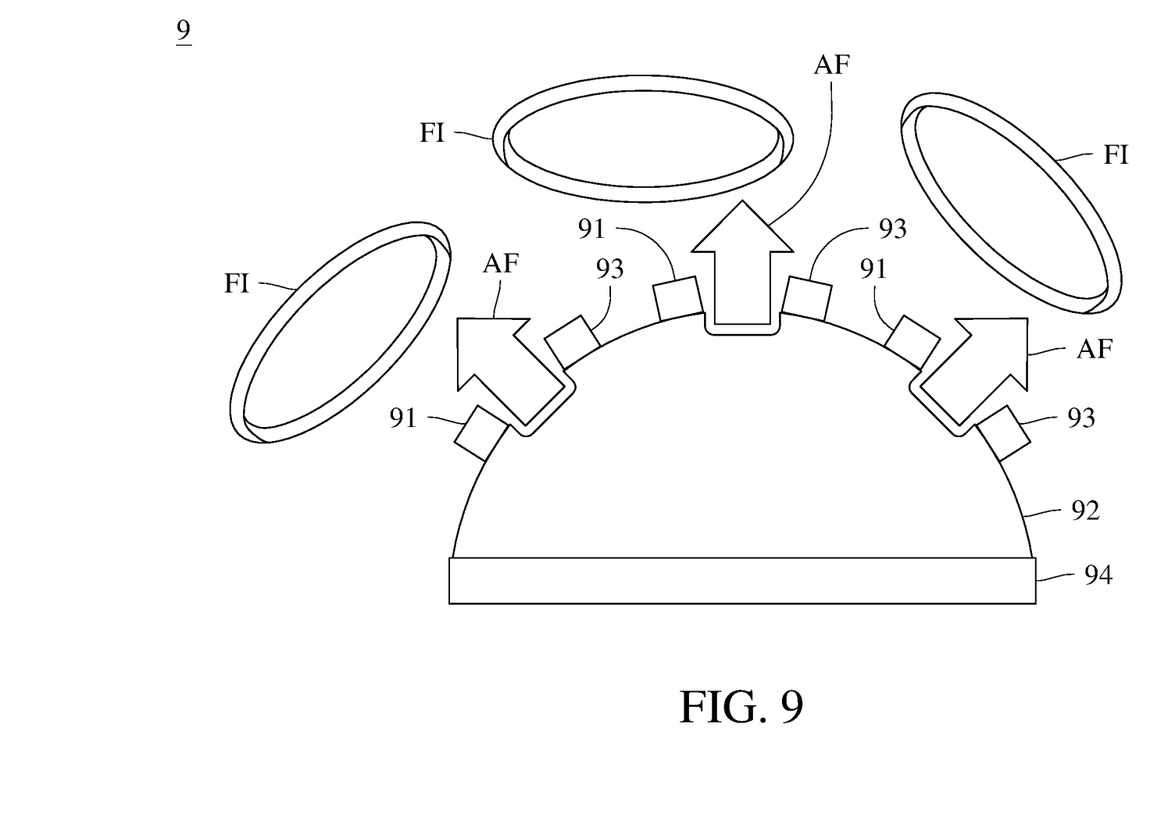
FIG. 9 is a schematic diagram illustrating the touch feedback device according to an eighth embodiment of the present invention.

Please refer to FIG. 9, which is a schematic diagram illustrating the touch feedback device according to an eighth embodiment of the present invention.

The touch feedback device 9 illustrated in FIG. 9 includes a plurality of optical imaging modules 91, an air supplying module 92, a plurality of sensing modules 93 and a signal processing module 94, wherein the connection and the elements and components to implement the optical imaging module 91, the air supplying module 92, the sensing module 93, and the signal processing module 94 are approximately the same as the optical imaging module 11, the air supplying module 12, the sensing module 13 and the signal processing module 14 mentioned referring to FIG. 1, therefore the same description will not be repeated.

In the present embodiment, the touch feedback device 9 may include a base which the signal processing module 94 is disposed on, the air supplying module 92 may be disposed on the base and may include a hemisphere-like structure, the hemisphere-like structure may include multiple air outlets, at least one optical imaging module 91 matching with at least one sensing module 93 may be disposed at the surrounding of the multiple air outlets. The optical imaging module 91, for example, may provide a floating image FI above the optical imaging module 91, and the air supplying module 92 may provide an airflow at the surrounding of the floating image FI, the sensing module 93 may sense the variation of the airflow when the sensed object contacts the airflow.

The air supplying module 92 may provide multiple airflows AF at once from multiple holes on the air supplying module 92 through an air injecting module, the optical imaging module 91 and the sensing module 93, for example, may be disposed at the surrounding of each airflow AF. The signal processing module 94 may increase or decrease the airflow generated by the air supplying module 92 according to the movement of the user sensed by the sensing module 93 to provide different touch feedback to the user.

The touch feedback device 9 may be an integration of multiple touch feedback devices, wherein the airflow AF is generated by the air supply module 92 and the floating image FI may be generated by the optical imaging module 91 after each of the touch feedback devices is turned on. When an object comes close, the signal processing module 94 may generate at least one feedback instruction according to the variation of air pressure, wherein the floating image FI may adjust the image by the image pattern, color, size, and other ways according to the variation air pressure to let the user know the current state.

The touch feedback device in all the embodiments above may be used as a non-contact button, and the feedback instruction generated by the signal processing module according to the sensed value of the sensing module may further include a feedback instruction used to trigger the function of the button.

Figure 10:
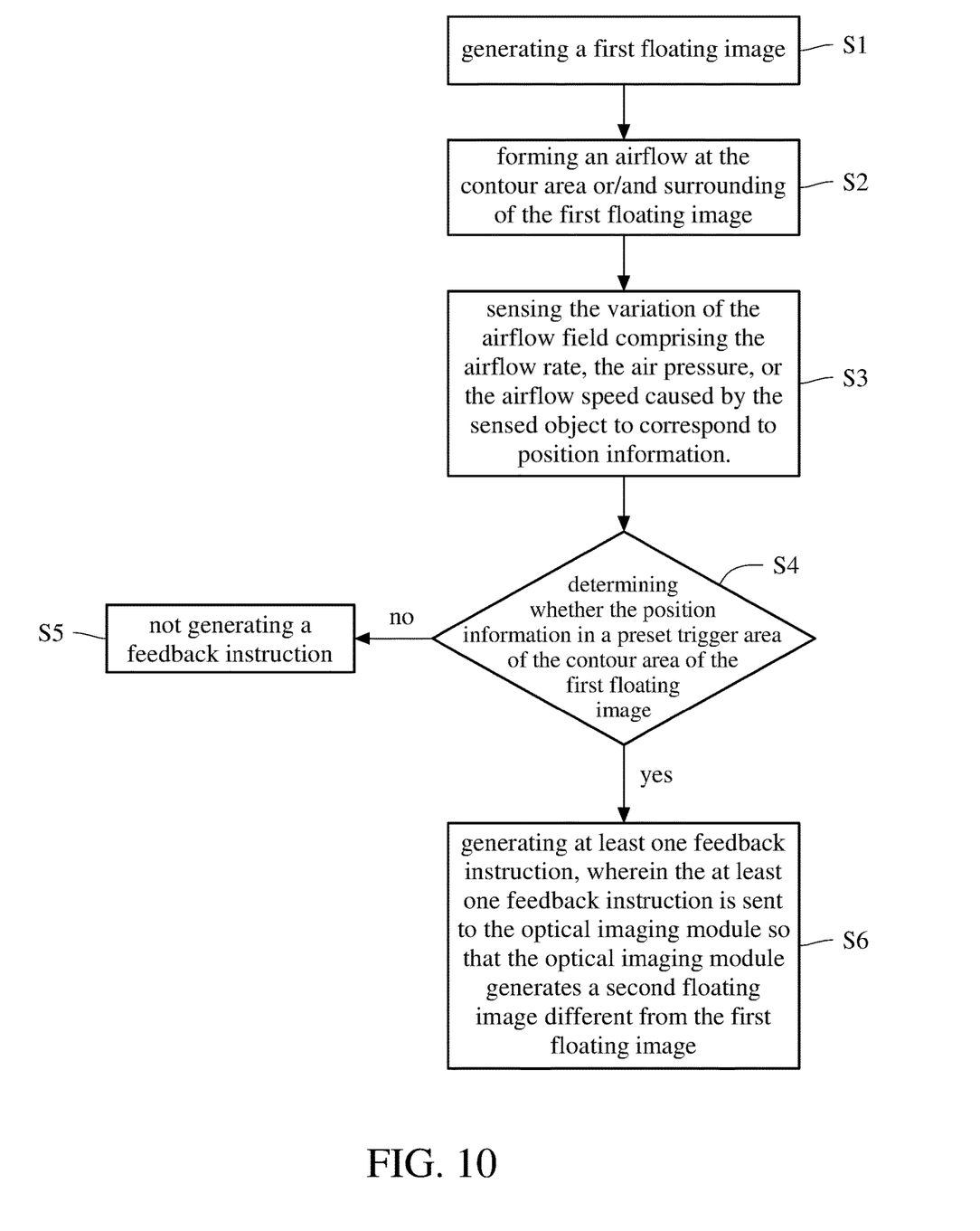
FIG. 10 is a flowchart illustrating a method of generating touch feedback according to an embodiment of the present invention.

Please refer to FIG. 10, which is a flow diagram illustrating a method of generating touch feedback according to the present invention, wherein the steps mentioned in FIG. 10 may be executed by one of the embodiments shown in FIG. 1 to FIG. 9.

As shown in FIG. 10, the method of generating touch feedback may include step S1: generating a first floating image; step S2: forming an airflow at the contour or/and surrounding of the first floating image; step S3: sensing the variation of the airflow field comprising the airflow rate, the air pressure, or the airflow speed caused by the sensed object to correspond to position information; step S4: determining whether the position information in the preset trigger area of the contour area of the first floating image; when the determined result of step S4 is no, execute step S5: don't generate the feedback instruction; and when the determined result of step S4 is yes, execute step S6: generating at least one feedback instruction, wherein the at least one feedback instruction is sent to the optical imaging module so that the optical imaging module generates a second floating image different from the first floating image.

Describing with reference to the touch feedback device 1 in FIG. 1, step S1 may be implemented by the optical imaging module 11, step S2 may be implemented by the air supplying module 12, step S3 may be implemented by the sensing module S3, and step S4 to step S6 may be implemented by the signal processing module 14. Moreover, when the determination result of step S4 is "no", the process may be looped back to step S3, wherein the feedback signal is not generated. That is, when the signal processing module 14 determines that the position information is not in the preset trigger area, the signal processing module 14 may determine whether the position information corresponding to the current airflow rate, air pressure, or airflow speed sensed by the sensing module 13 is in the preset trigger area again.

One or more embodiments of the present invention of touch feedback device and method for generating touch feedback may generate airflow field at the contour and/or surrounding of the floating image, and change a first floating image into a second floating image according to the variation of the airflow field to provide the users touch feedback and visual changes.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A touch feedback device, comprising:
    an optical imaging module configured to generate a first floating image;
    an air supplying module configured to form an airflow field at a contour area and/or surrounding of the first floating image;
    a sensing module disposed at a position along a direction of the airflow field from the air supplying module, and configured to sense a variation of the airflow field, comprising an airflow rate, an air pressure, or an airflow speed, and correspond to position information of an object, wherein the variation of the airflow field is a preset value; and
    a signal processing module connected to the optical imaging module, the air supplying module, and the sensing module, and configured to generate at least one feedback instruction, when determining based on the preset value that the position information of the object is in a preset trigger area of the contour area of the first floating image, wherein the at least one feedback instruction is sent to the optical imaging module so that the optical imaging module generates a second floating image which is different from the first floating image.

2. The touch feedback device of claim 1, wherein the second floating image has a different shape, color, image pattern, height, size or luminance than the first floating image.

3. The touch feedback device of claim 1, wherein the air supplying module comprises a plurality of air supplying holes arranged along a project direction of the first floating image, the plurality of air supplying holes provide a plurality of airflow layers, respectively, to form the airflow field, and the plurality of airflow layers are distributed in different depths.

4. The touch feedback device of claim 3, wherein the plurality of airflow layers have different airflow intensity.

5. The touch feedback device of claim 3, wherein at least two of the plurality of airflows have the same airflow intensity.

6. The touch feedback device of claim 1, wherein the air supply module comprises an air supply hole, the air supply hole provides an annulus airflow in an air supply direction, and the air supply direction is different from a project direction of the first floating image.

7. The touch feedback device of claim 1, wherein the air supply module comprises a plurality of air supply holes disposed along a circumference, and the plurality of air supply holes provide a plurality of radial airflows, respectively, to form the airflow field.

8. The touch feedback device of claim 1, wherein the sensing module further comprises a depth sensor, the depth sensor is configured to detect depth information of a sensed object in the airflow field, and the signal processing module uses the depth information matching a preset condition as a trigger condition to generate the at least one feedback instruction.

9. The touch feedback device of claim 1, wherein the at least one feedback instruction comprises a light emission feedback instruction and a sound feedback instruction, the light emission feedback instruction is used for the optical imaging module to generate the second floating image, and the sound feedback instruction is used to trigger sound signal.

10. A method for generating touch feedback, adapted to a touch feedback device comprising an optical imaging module, an air supplying module, a sensing module, and a signal processing module, wherein the method of generating touch feedback comprises:

generating a first floating image with the optical imaging module;

forming an airflow field at a contour area and/or surrounding of the first floating image by the air supplying module;

sensing a variation of the airflow field at a position along a direction of the airflow field from the air supplying module to correspond to position information of an object by the sensing module, wherein the variation of the airflow field is a preset value and the airflow field comprises an airflow rate, an air pressure, or an airflow speed; and when determining based on the preset value that the position information of the object is located at a preset trigger area of the contour area of the first floating image, generating at least one feedback instruction with the signal processing module, wherein the at least one feedback instruction is sent to the optical imaging module so that the optical imaging module generates a second floating image which is different from the first floating image.

11. The method for generating touch feedback of claim 10, wherein the second floating image has a different shape, color, image pattern, height, size or luminance than the first floating image.

12. The method for generating touch feedback of claim 10, wherein the airflow field comprises a plurality of airflow layers, the plurality of airflow layers are distributed in different depths.

13. The method for generating touch feedback of claim 12, wherein the plurality of airflow layers have different flow intensities, respectively.

14. The method for generating touch feedback of claim 12, wherein at least two of the plurality of airflow layers have the same airflow intensity.

15. The method for generating touch feedback of claim 10, wherein the airflow field comprises an annulus airflow.

16. The method for generating touch feedback of claim 10, wherein the airflow field comprises a plurality of radial airflows.

17. The method for generating touch feedback of claim 10, further comprises a depth sensor configured to detect depth information of a sensed object in the airflow field, and the signal processing module configured to use the depth information matching a preset condition as a trigger condition to generate the at least one feedback instruction.

18. The method for generating touch feedback of claim 10, wherein the at least one feedback instruction comprises a light emission feedback instruction and a sound feedback instruction, the light emission feedback instruction is used for the optical imaging module to generate the second floating image, and the sound feedback instruction is used to trigger sound signal.

* * * * *